US010933499B2

(12) United States Patent
Xu et al.

(10) Patent No.: US 10,933,499 B2
(45) Date of Patent: Mar. 2, 2021

(54) WHEEL AIRTIGHT RUBBER RING PRESS-FITTING DEVICE

(71) Applicant: CITIC Dicastal CO., LTD, Qinhuangdao (CN)

(72) Inventors: Zuo Xu, Qinhuangdao (CN); Huiying Liu, Qinhuangdao (CN); Baojun Shi, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 156 days.

(21) Appl. No.: 16/044,943

(22) Filed: Jul. 25, 2018

(65) Prior Publication Data

US 2019/0262952 A1  Aug. 29, 2019

(30) Foreign Application Priority Data

Feb. 24, 2018 (CN) .......................... 201810157080.X

(51) Int. Cl.
*B23P 19/02* (2006.01)
*B23P 19/08* (2006.01)
(Continued)

(52) U.S. Cl.
CPC ............. *B23P 19/02* (2013.01); *B23P 19/001* (2013.01); *B23P 19/084* (2013.01); *B23P 19/10* (2013.01);
(Continued)

(58) Field of Classification Search
CPC ....... B23P 19/02; B23P 19/001; B23P 19/084; B23P 19/10; B23P 2700/50;
(Continued)

(56) References Cited

U.S. PATENT DOCUMENTS 5,170,828 A * 12/1992 Curcuri ............... B60C 25/0512
157/1
6,138,737 A * 10/2000 Bocquet ............... B60C 25/132
157/1.1
(Continued)

FOREIGN PATENT DOCUMENTS

CN   203791607 U   8/2014
CN   107283000 A   10/2017
(Continued)

OTHER PUBLICATIONS

Mechanical Design Website: Ballscrews (Year: 2017).*

*Primary Examiner* — Tyrone V Hall, Jr.
*Assistant Examiner* — Makena S Markman
(74) *Attorney, Agent, or Firm* — Calfee, Halter & Griswold LLP

(57) ABSTRACT

Disclosed is a wheel airtight rubber ring press-fitting device, consisting of a frame, first servo motors, ball screw pairs, first guide rails, a first cylinder and the like. The device may be used for automatic continuous production. The central axis of an airtight rubber ring coincides with the central axis of the outer rim of a wheel, so that the positioning precision is improved, and high-precision press-fitting is realized.

(Continued)

Through cyclic switching of double manipulators, the press-fitting feeding time is nested, the press-fitting cycle is shortened, and the working efficiency is improved.

1 Claim, 4 Drawing Sheets

(51) Int. Cl.
*B23P 19/10* (2006.01)
*B60B 31/00* (2006.01)
*B60B 7/00* (2006.01)
*B60B 30/06* (2006.01)
*B60C 25/00* (2006.01)
*B23P 19/00* (2006.01)

(52) U.S. Cl.
CPC ............ *B23P 2700/50* (2013.01); *B60B 7/00* (2013.01); *B60B 30/06* (2013.01); *B60B 31/00* (2013.01); *B60B 2320/10* (2013.01); *B60C 25/00* (2013.01); *B60G 2206/93* (2013.01)

(58) Field of Classification Search
CPC ... B60G 2206/93; B60B 7/00; B60B 2320/10; B25B 27/026; B60C 25/00
See application file for complete search history.

(56) References Cited

U.S. PATENT DOCUMENTS

| 6,463,982 | B1 * | 10/2002 | Doan ...................... B60C 25/00 157/1.1 |
| 8,770,236 | B2 * | 7/2014 | Reece ..................... B60S 5/046 141/38 |
| 8,973,735 | B2 * | 3/2015 | Overley ................. B65G 29/00 198/418.3 |
| 9,061,555 | B2 * | 6/2015 | Mallett ............... B60C 25/0515 |
| 9,126,567 | B2 * | 9/2015 | Rogalla ................ B60C 25/145 |
| 9,731,352 | B2 * | 8/2017 | Xue .......................... B23B 5/28 |
| 9,746,396 | B2 * | 8/2017 | Seimoto .............. G01M 17/021 |
| 10,589,579 | B2 * | 3/2020 | Ueda ....................... B60C 19/00 |
| 2017/0182761 | A1 | 6/2017 | Xue et al. |

FOREIGN PATENT DOCUMENTS

| CN | 107414193 A | 12/2017 |
| CN | 206898401 U | 1/2018 |
| DE | 102005013423 A1 | 9/2006 |
| GB | 2273546 A | 6/1994 |
| JP | H10267128 A | 10/1998 |

* cited by examiner

US 10,933,499 B2

WHEEL AIRTIGHT RUBBER RING PRESS-FITTING DEVICE

CROSS-REFERENCE TO RELATED APPLICATIONS

This application claims priority to Chinese Patent Application No. 201810157080.X filed on Feb. 24, 2018, which is hereby incorporated by reference in its entirety.

TECHNICAL FIELD

The present application relates to the technical field of installation of wheel airtight rubber rings, specifically to a device for press-fitting an airtight sealing rubber ring onto a wheel.

BACKGROUND ART

During airtight detection of a wheel, a lid-shaped airtight rubber disc is needed to cover the outer rim of the wheel, and the circumference and the bottom of the wheel are sealed, so that the outer rim of the wheel forms a closed cavity and the pressure leakage is detected. When the front rim of the wheel is continuous without disconnection, the front rim of the wheel can be sealed by the lid-shaped airtight rubber disc. However, discontinuous rims are becoming more and more popular. Some rims still have height differences of about 2-5 mm. At this time, the rim cannot be sealed directly using the lid-shaped airtight rubber disc, but an airtight rubber ring is press-fitted on the rim to seal the rim and then the airtight detection is performed. When the rubber ring is press-fitted manually, the efficiency and the precision are low, and the deflection phenomenon occurs easily.

SUMMARY OF THE INVENTION

The object of the present application is to provide a device for press-fitting an airtight rubber ring onto a wheel with high precision, which can be used for automatic continuous production. The device is advanced in process, novel in structure, accurate and efficient.

A wheel airtight rubber ring press-fitting device consists of a frame, first servo motors, ball screw pairs, first guide rails, a first cylinder, a left sliding plate, a gear rack, a right sliding plate, rough positioning wheels, lifting plates, second cylinders, second guide rails, sliding blocks, precision positioning wheels, airtight rubber rings, first guide posts, a pressure plate, a first lifting platform, third cylinders, fourth cylinders, second guide posts, a second servo motor, a second lifting platform, a rotating table, a first manipulator, a second manipulator, fifth cylinders, third guide posts and a third lifting platform. These parts constitute a wheel positioning unit, a rubber ring placement unit, a rubber ring supply unit and a rubber ring press-fitting unit.

The wheel positioning unit completes rough positioning and precision positioning of a wheel, the rubber ring placement unit completes rubber ring station switching placement, the rubber ring supply unit completes automatic feeding of the rubber rings, and the rubber ring press-fitting unit completes press-fitting of the rubber rings.

The two first guide rails are fixed on a support plate, the left sliding plate and the right sliding plate are mounted on the first guide rails and connected through the gear rack, and two rough positioning wheels 9 are mounted on the left sliding plate and the other two rough positioning wheels 9 are mounted on the right sliding plate. When the first cylinder drives the left sliding plate to move, the right sliding plate moves synchronously under the action of the gear rack, and the wheel might be roughly positioned by the four rough positioning wheels. A first servo motor is fixedly mounted on the left side of the frame, the output end of the first servo motor is connected with a ball screw pair, the first servo motor controls the up-and-down movement of a lifting plate under the guidance of a guide rail, a second cylinder is fixed on the lifting plate, the output end of the second cylinder is connected to a sliding block to control the horizontal movement of the sliding block under the guidance of the second guide rail, and two precision positioning wheels are mounted at the front end of the sliding block and used for precisely positioning an outer bead seat. The right side of the frame is arranged in the same manner as the left side, and two precision positioning wheels are symmetrically distributed. After the wheel is roughly positioned, the rough positioning wheels are retracted and reset, and the second cylinders on the left and right sides are simultaneously started to drive the four precision positioning wheels to contact the outer bead seat of the wheel so as to realize precision positioning. The heights of the precision positioning wheels can be adjusted through the first servo motors, so that this device can be used for press-fitting rubber rings onto wheels with different heights and is stronger in versatility. The turning process of the aluminum wheel is completed in two times. The inner rim is turned by first turning, and the outer rim is turned by second turning. Therefore, the inner rim and the outer rim have a coaxial deviation. For the assembly line operation, the inner rim is roughly positioned first, then the outer rim is precisely positioned, and the central axis of the press-fitted airtight rubber ring coincides with the center axis of the outer rim of the wheel, thereby greatly improving the positioning precision and eliminating the risk of press-fitting deflection of the rubber ring. This is the wheel positioning unit.

The output ends of the fourth cylinders are connected to the second lifting platform, and the fourth cylinders control the up-and-down movement of the second lifting platform under the guidance of the second guide posts. The second servo motor is fixed on the second lifting platform, and the output end of the second servo motor is connected to the rotating table. The first manipulator and the second manipulator are bilaterally symmetrically mounted on the rotating table. During working, the first manipulator on the left side is used for placing an airtight rubber ring, the second manipulator on the right side is used for loading next airtight rubber ring, and the left and right positions of the first manipulator and the second manipulator can be cyclically switched through the second servo motor. The output ends of the fifth cylinders are connected to the third lifting platform, the fifth cylinders control the up-and-down movement of the third lifting platform under the guidance of the third guide posts, and the airtight rubber rings are vertically stacked on the third lifting platform. In the initial state, the first manipulator on the left side is loaded with an airtight rubber ring, and the second manipulator on the right side is unloaded. After the wheel is precisely positioned, the fourth cylinders drive the second lifting platform to descend, so that the airtight rubber ring contacts the front side of the wheel. Then, the first manipulator is opened to release the airtight rubber ring. Next, the fourth cylinders drive the second lifting platform to descend again a certain distance to reserve a space for press-fitting. The fifth cylinders drive the third lifting platform to ascend a certain distance during press-fitting so that the airtight rubber ring stacked at the top rises to an appropriate height clamped by the second manipulator, and then the second manipulator clamps the top airtight rubber ring. These are the airtight rubber ring placement and supply units.

The third cylinders are mounted at the top of the frame, the third cylinders control the up-and-down movement of the first lifting platform under the guidance of the first guide posts, and the pressure plate is fixed on the first lifting platform. After the wheel is precisely positioned and the airtight rubber ring is placed on the front side of the wheel, the third cylinders are started, the pressure plate is driven to descend, and the airtight rubber ring is pressed into the outer rim of the wheel. This is the airtight rubber ring press-fitting unit.

The working process of the wheel airtight rubber ring press-fitting device is: first, the heights of the precision positioning wheels are adjusted through the first servo motors according to a wheel produced on line. The first cylinder drives the left sliding plate to move, the right sliding plate moves synchronously under the action of the gear rack, the wheel is roughly positioned through the four rough positioning wheels, and then the rough positioning wheels are retracted and reset. Next, the second cylinders on the left and right sides are started simultaneously to drive the four precision positioning wheels to contact the outer bead seat of the wheel to precisely position the wheel. In the initial state, the first manipulator on the left side is loaded with a airtight rubber rings, and the second manipulator on the right side is unloaded. After the wheel is precisely positioned, the fourth cylinders drive the second lifting platform to descend, so that the airtight rubber ring contacts the front side of the wheel. Then, the first manipulator is opened to release the airtight rubber ring. Next, the fourth cylinders drive the second lifting platform to descend again a certain distance to reserve a space for press-fitting. The third cylinders then drive the pressure plate to descend to press the airtight rubber ring into the outer rim of the wheel, the fifth cylinders drive the third lifting platform to ascend a certain distance during press-fitting so that the airtight rubber ring stacked at the top rises to an appropriate height clamped by the arm of second manipulator, and then the second manipulator clamps the top airtight rubber ring. After the first wheel is press-fitted, the precision positioning wheels are retracted and reset, the pressure plate ascends and resets, then the fourth cylinders drive the second lifting platform to ascend and reset, the second servo motor is started to drive the rotating table to rotate 180 degrees, the airtight rubber ring clamped by the second manipulator is switched to the left side, the first manipulator is switched to the right side and is unloaded, so far, the device completes a cycle and restores to the initial state to wait for the next wheel positioning followed by press-fitting, and so on.

The present application might be used for automatic continuous production. Through a reasonable process layout, the central axis of the airtight rubber ring coincides with the central axis of the outer rim of the wheel, so that the positioning precision is improved, and high-precision press-fitting is realized. Through cyclic switching of the double manipulators, the press-fitting feeding time is nested, the press-fitting cycle is shortened, and the working efficiency is improved.

Figure 1:
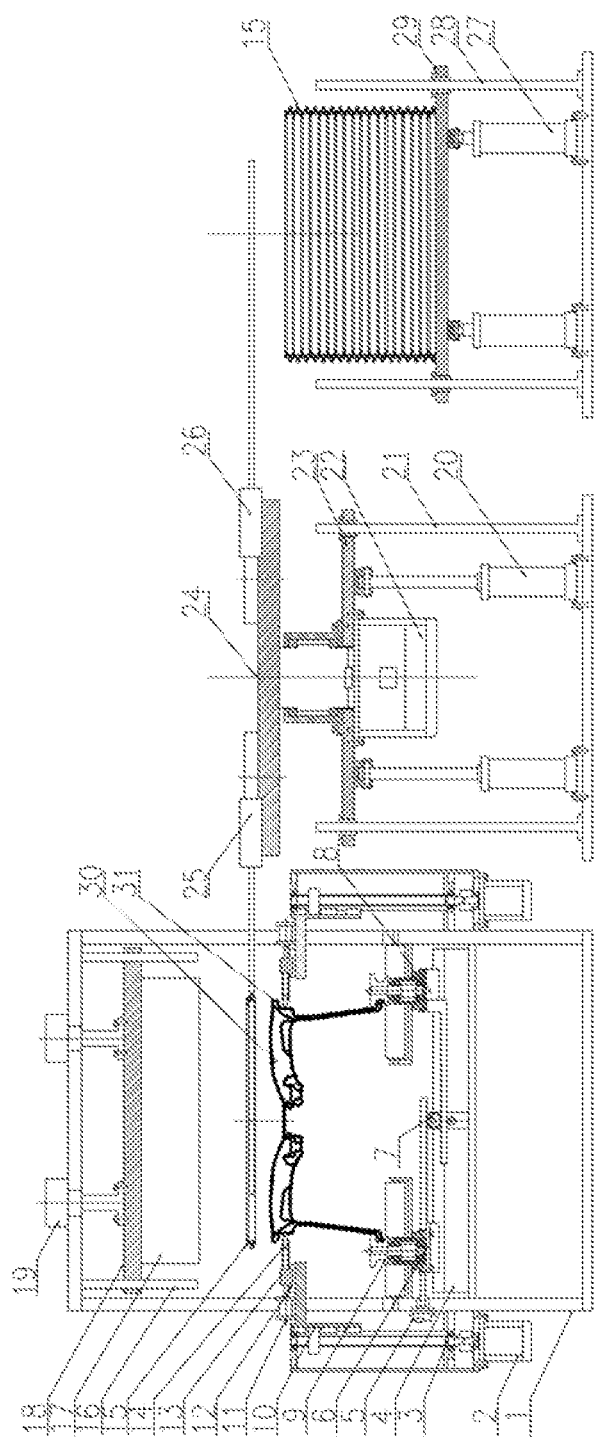
FIG. 1 is a front view of a wheel airtight rubber ring press-fitting device of the present application.
Figure 2:
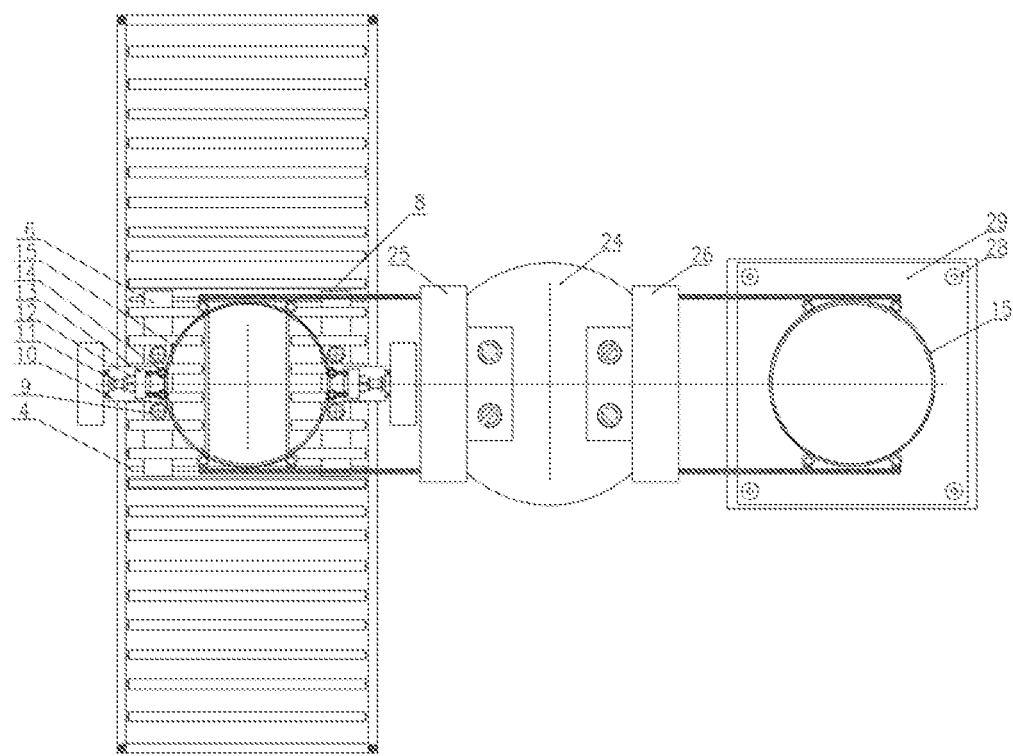
FIG. 2 is a top view of the wheel airtight rubber ring press-fitting device of the present application.
Figure 3:
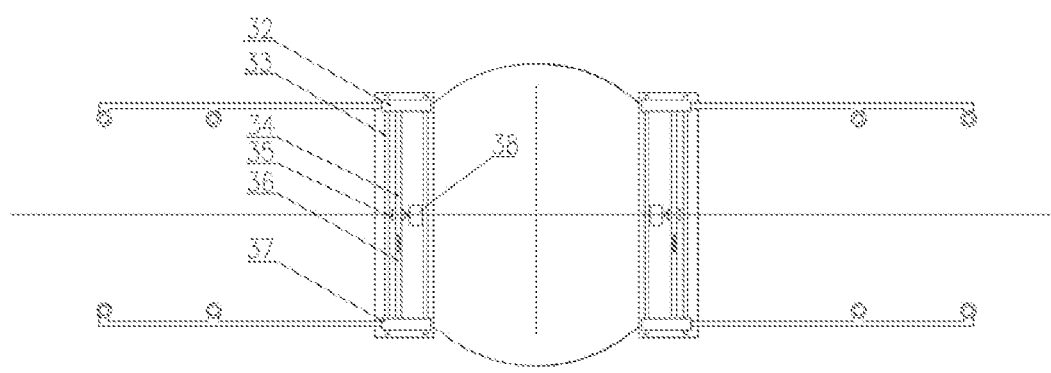
Figure 4:
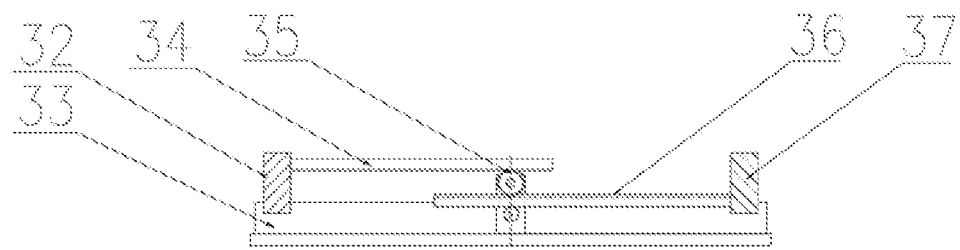

In which, 1—frame, 2—first servo motor, 3—ball screw pair, 4—first guide rail, 5—first cylinder, 6—left sliding plate, 7—gear rack, 8—right sliding plate, 9—rough positioning wheel, 10—lifting plate, 11—second cylinder, 12—second guide rail, 13—sliding block, 14—precision positioning wheel, 15—airtight rubber ring, 16—first guide post, 17—pressure plate, 18—first lifting platform, 19—third cylinder, 20—fourth cylinder, 21—second guide post, 22—second servo motor, 23—second lifting platform, 24—rotating table, 25—first manipulator, 26—second manipulator, 27—fifth cylinder, 28—third guide post, 29—third lifting platform, 30—wheel, 31—outer bead seat.

DETAILED DESCRIPTION OF THE INVENTION

The details and working conditions of the specific device proposed by the present application will be described below in combination with the accompanying drawings.

A wheel airtight rubber ring press-fitting device consists of a frame 1, first servo motors 2, ball screw pairs 3, first guide rails 4, a first cylinder 5, a left sliding plate 6, a gear rack 7, a right sliding plate 8, rough positioning wheels 9, lifting plates 10, second cylinders 11, second guide rails 12, sliding blocks 13, precision positioning wheels 14, airtight rubber rings 15, first guide posts 16, a pressure plate 17, a first lifting platform 18, third cylinders 19, fourth cylinders 20, second guide posts 21, a second servo motor 22, a second lifting platform 23, a rotating table 24, a first manipulator 25, a second manipulator 26, fifth cylinders 27, third guide posts 28 and a third lifting platform 29. These parts constitute a wheel positioning unit, a rubber ring placement unit, a rubber ring supply unit and a rubber ring press-fitting unit.

The wheel positioning unit completes rough positioning and precision positioning of a wheel, the rubber ring placement unit completes rubber ring station switching placement, the rubber ring supply unit completes automatic feeding of the rubber rings, and the rubber ring press-fitting unit completes press-fitting of the rubber rings.

The two first guide rails 4 are fixed on a support plate, the left sliding plate 6 and the right sliding plate 8 are mounted on the first guide rails 4 and connected through the gear rack 7, and two rough positioning wheels 9 are mounted on the left sliding plate 6 and the other two rough positioning wheels 9 are mounted on the right sliding plate 8. When the first cylinder 5 drives the left sliding plate 6 to move, the right sliding plate 8 moves synchronously under the action of the gear rack 7, and the wheel can be roughly positioned by the four rough positioning wheels 9. A first servo motor 2 is fixedly mounted on the left side of the frame 1, the output end of the first servo motor 2 is connected with a ball screw pair 3, the first servo motor 2 controls the up-and-down movement of a lifting plate 10 under the guidance of a guide rail, a second cylinder 11 is fixed on the lifting plate 10, the output end of the second cylinder 11 is connected to a sliding block 13 to control the horizontal movement of the sliding block 13 under the guidance of the second guide rail 12, and two precision positioning wheels 14 are mounted at the front end of the sliding block 13 and used for precisely positioning an outer bead seat 31. The right side of the frame 1 is arranged in the same manner as the left side, and two precision positioning wheels 14 are symmetrically distributed. After the wheel is roughly positioned, the rough positioning wheels 9 are retracted and reset, and the second cylinders 11 on the left and right sides are simultaneously started to drive the four precision positioning wheels 14 to contact the outer bead seat of the wheel so as to realize precision positioning. The heights of the precision positioning wheels 14 can be adjusted through the first servo motors 2, so that this device can be used for press-fitting rubber rings onto wheels with different heights and is stronger in versatility. The turning process of the aluminum wheel is completed in two times. The inner rim is turned by first turning, and the outer rim is turned by second turning. Therefore, the inner rim and the outer rim have a coaxial deviation. For the assembly line operation, the inner rim is roughly positioned first, then the outer rim is precisely positioned, and the central axis of the press-fitted airtight rubber ring coincides with the center axis of the outer rim of the wheel 30, thereby greatly improving the positioning precision and eliminating the risk of press-fitting deflection of the rubber ring. This is the wheel positioning unit.

The output ends of the fourth cylinders 20 are connected to the second lifting platform 23, and the fourth cylinders 20 control the up-and-down movement of the second lifting platform 23 under the guidance of the second guide posts 21. The second servo motor 22 is fixed on the second lifting platform 23, and the output end of the second servo motor 22 is connected to the rotating table 24. The first manipulator 25 and the second manipulator 26 are bilaterally symmetrically mounted on the rotating table 24. During working, the first manipulator 25 on the left side is used for placing an airtight rubber ring 15, the second manipulator 26 on the right side is used for loading next airtight rubber ring 15, and the left and right positions of the first manipulator 25 and the second manipulator 26 can be cyclically switched through the second servo motor 22. The output ends of the fifth cylinders 27 are connected to the third lifting platform 29, the fifth cylinders 27 control the up-and-down movement of the third lifting platform 29 under the guidance of the third guide posts 28, and the airtight rubber rings 15 are vertically stacked on the third lifting platform 29. In the initial state, the first manipulator 25 on the left side is loaded with an airtight rubber ring 15, and the second manipulator 26 on the right side is unloaded. After the wheel is precisely positioned, the fourth cylinders 20 drive the second lifting platform 23 to descend, so that the airtight rubber ring 15 contacts the front side of the wheel. Then, the first manipulator 25 is opened to release the airtight rubber ring 15. Next, the fourth cylinders 20 drive the second lifting platform 23 to descend again a certain distance to reserve a space for press-fitting. The fifth cylinders 27 drives the third lifting platform 29 to ascend a certain distance during press-fitting so that the airtight rubber ring 15 stacked at the top rises to an appropriate height clamped by the second manipulator 26, and then the second manipulator 26 clamps the top airtight rubber ring 15. These are the airtight rubber ring placement and supply units.

The third cylinders 19 are mounted at the top of the frame, the third cylinders 19 control the up-and-down movement of the first lifting platform 18 under the guidance of the first guide posts 16, and the pressure plate 17 is fixed on the first lifting platform 18. After the wheel is precisely positioned and the airtight rubber ring 15 is placed on the front side of the wheel, the third cylinders 19 are started, the pressure plate 17 is driven to descend, and the airtight rubber ring 15 is pressed into the outer rim of the wheel. This is the airtight rubber ring press-fitting unit.

The working process of the wheel airtight rubber ring press-fitting device is: first, the heights of the precision positioning wheels 14 are adjusted through the first servo motors 2 according to a wheel produced on line. The first cylinder 5 drives the left sliding plate 6 to move, the right sliding plate 8 moves synchronously under the action of the gear rack 7, the wheel is roughly positioned through the four rough positioning wheels 9, and then the rough positioning wheels 9 are retracted and reset. Next, the second cylinders 11 on the left and right sides are started simultaneously to drive the four precision positioning wheels 14 to contact the outer bead seat of the wheel to precisely position the wheel. In the initial state, the first manipulator 25 on the left side is loaded with a airtight rubber ring 15, and the second manipulator 26 on the right side is unloaded. After the wheel is precisely positioned, the fourth cylinders 20 drive the second lifting platform 23 to descend, so that the airtight rubber ring 15 contacts the front side of the wheel. Then, the first manipulator 25 is opened to release the airtight rubber ring 15. Next, the fourth cylinders 20 drive the second lifting platform 23 to descend again a certain distance to reserve a space for press-fitting. The third cylinders 19 then drive the pressure plate 17 to descend to press the airtight rubber ring 15 into the outer rim of the wheel, the fifth cylinders 27 drive the third lifting platform 29 to ascend a certain distance during press-fitting so that the airtight rubber ring 15 stacked at the top rises to an appropriate height clamped by the arm of second manipulator 26, and then the second manipulator 26 clamps the top airtight rubber ring 15. After the first wheel is press-fitted, the precision positioning wheels 14 are retracted and reset, the pressure plate 17 ascends and resets, then the fourth cylinders 20 drive the second lifting platform 23 to ascend and reset, the second servo motor 22 is started to drive the rotating table 24 to rotate 180 degrees, the airtight rubber ring 15 clamped by the second manipulator 26 is switched to the left side, the first manipulator 25 is switched to the right side and is unloaded, so far, the device completes a cycle and restores to the initial state to wait for the next wheel positioning followed by press-fitting, and so on.

The present application can be used for automatic continuous production. Through a reasonable process layout, the central axis of the airtight rubber ring coincides with the central axis of the outer rim of the wheel, so that the positioning precision is improved, and high-precision press-fitting is realized. Through cyclic switching of the double manipulators, the press-fitting feeding time is nested, the press-fitting cycle is shortened, and the working efficiency is improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel airtight rubber ring press-fitting device, comprising: a frame, first servo motors, ball screw pairs, first guide rails, a first cylinder, a left sliding plate, a gear rack, a right sliding plate, rough positioning wheels, lifting plates, two second cylinders, second guide rails, sliding blocks, four precision positioning wheels, airtight rubber rings, first guide posts, a pressure plate, a first lifting platform, four third cylinders, two fourth cylinders, second guide posts, a second servo motor, a second lifting platform, a rotating table, a first manipulator, a second manipulator, two fifth cylinders, third guide posts and a third lifting platform, wherein the wheel airtight rubber ring press-fitting device, further comprising a wheel positioning unit, a rubber ring placement and supply unit, and a rubber ring press-fitting unit;

the wheel positioning unit is as follows: one of the first servo motors is fixedly mounted on the left side of the frame, the output end of the first servo motor is connected with one of the ball screw pairs, the first servo motor controls the up-and-down movement of a lifting plate under the guidance of a guide rail, a second cylinder is fixed on the lifting plate, the output end of the second cylinder is connected with a sliding block to control the horizontal movement of the sliding block under the guidance of a second guide rail, and two of the four precision positioning wheels are mounted at the front end of the sliding block and used for precisely positioning an outer bead seat; the right side of the frame is arranged in the same manner as the left side, and the other two of the four precision positioning wheels are symmetrically distributed; after a wheel is roughly positioned, the rough positioning wheels are retracted and reset, and the second cylinders on the left and right sides are simultaneously started to drive the four precision positioning wheels to contact the outer bead seat of the wheel so as to realize precision positioning;

the rubber ring placement and supply unit is as follows: the output ends of the fourth cylinders are connected to the second lifting platform, and the fourth cylinders control the up-and-down movement of the second lifting platform under the guidance of the second guide posts; the second servo motor is fixed on the second lifting platform, and the output end of the second servo motor is connected to the rotating table; the first manipulator and the second manipulator are bilaterally symmetrically mounted on the rotating table; during working, the first manipulator on the left side is used for placing one of the airtight rubber rings, the second manipulator on the right side is used for loading another of the airtight rubber rings, and the left and right positions of the first manipulator and the second manipulator are configured to be cyclically switched through the second servo motor; the output ends of the fifth cylinders are connected to the third lifting platform, the fifth cylinders control the up-and-down movement of the third lifting platform under the guidance of the third guide posts, and the airtight rubber rings are vertically stacked on the third lifting platform; and in an initial state, the left first manipulator is loaded with one of the airtight rubber rings, and the right second manipulator is unloaded; after the wheel is precisely positioned, the fourth cylinders drive the second lifting platform to descend, so that the airtight rubber ring contacts the front side of the wheel; then, the first manipulator is opened to release the airtight rubber ring; next, the fourth cylinders drive the second lifting platform to descend again a certain distance to reserve a space for press-fitting; the fifth cylinders drive the third lifting platform to ascend a certain distance during press-fitting so that the airtight rubber ring stacked at the top rises to an appropriate height clamped by the second manipulator, and then the second manipulator clamps the top airtight rubber ring;

the rubber ring press-fitting unit is as follows: the third cylinders are mounted at the top of the frame, the third cylinders control the up-and-down movement of the first lifting platform under the guidance of the first guide posts, and the pressure plate is fixed on the first lifting platform; after the wheel is precisely positioned and the airtight rubber ring is placed on the front side of the wheel, the third cylinders are started, the pressure plate is driven to descend, and the airtight rubber ring is pressed into the outer rim of the wheel.

\* \* \* \* \*